US012759670B2

(12) United States Patent
Sjöö et al.

(10) Patent No.: US 12,759,670 B2
(45) Date of Patent: Oct. 13, 2026

(54) MOBILE FUEL DISTRIBUTION STATION

(71) Applicant: Secfuel AB, Stockholm (SE)

(72) Inventors: Niklas Sjöö, Danderyd (SE); Karl-Oskar Tjernström, Stockholm (SE)

(73) Assignee: Secfuel AB, Stockholm (SE)

( * ) Notice: Subject to any disclaimer, the term of this patent is extended or adjusted under 35 U.S.C. 154(b) by 12 days.

(21) Appl. No.: 18/703,237

(22) PCT Filed: Oct. 21, 2022

(86) PCT No.: PCT/EP2022/079417
§ 371 (c)(1),
(2) Date: Apr. 19, 2024

(87) PCT Pub. No.: WO2023/067159
PCT Pub. Date: Apr. 27, 2023

(65) Prior Publication Data
US 2024/0417036 A1 Dec. 19, 2024

(30) Foreign Application Priority Data
Oct. 21, 2021 (EP) .................................... 21204067

(51) Int. Cl.
*B63B 17/00* (2006.01)
*B63B 35/28* (2006.01)
(Continued)

(52) U.S. Cl.
CPC .......... *B63B 17/0036* (2013.01); *B63B 35/28* (2013.01); *B67D 7/04* (2013.01);
(Continued)

(58) Field of Classification Search
CPC ....... B63B 17/0036; B63B 35/28; B67D 7/04; B67D 7/08; B67D 7/3209; B67D 9/00
See application file for complete search history.

(56) References Cited

U.S. PATENT DOCUMENTS 3,076,205 A * 2/1963 Schultz ................. B63B 22/021 D25/56
5,562,162 A * 10/1996 Webb ........................ B60S 5/02 141/82
(Continued)

FOREIGN PATENT DOCUMENTS

IT 201900020002 A1 4/2021
KR 20170089716 A * 8/2017 ................ B63J 3/00

OTHER PUBLICATIONS

International Preliminary Report on Patentability received for PCT Patent Application No. PCT/EP2022/079417, mailed on May 2, 2024, 11 pages.

(Continued)

*Primary Examiner* — Timothy L Maust
(74) *Attorney, Agent, or Firm* — MEDLER FERRO WOODHOUSE & MILLS PLLC

(57) ABSTRACT

Embodiments herein relate to a mobile fuel distribution station including a plurality of fuel tanks, one or more fuel pumps arranged to distribute fuel from said fuel tanks to users, a central fuel refill arrangement for refilling of one or more of said plurality of fuel tanks, and a fuel leakage prevention system, a central fuel refill arrangement and a fuel leakage prevention system arranged to prevent leakage from the central fuel refill arrangement, and from any of the plurality of fuel tanks. Other embodiments herein relate to a method and a system for predicting points of time for refilling fuel in one or more such mobile fuel distribution stations.

7 Claims, 10 Drawing Sheets

(51) Int. Cl.
*B67D 7/04* (2010.01)
*B67D 7/08* (2010.01)
*B67D 7/32* (2010.01)
*B67D 9/00* (2010.01)

(52) U.S. Cl.
CPC ............. *B67D 7/08* (2013.01); *B67D 7/3209* (2013.01); *B67D 9/00* (2013.01)

(56) References Cited

U.S. PATENT DOCUMENTS

| | | | | | |
|---|---|---|---|---|---|
| 5,971,039 | A * | 10/1999 | Webb | B63B 35/00 141/311 A |
| 8,403,071 | B1 | 3/2013 | Webb | |
| 10,202,271 | B2 * | 2/2019 | Walsh | G05B 15/02 |
| 10,626,570 | B1 * | 4/2020 | Beaver, Jr. | B01J 20/2804 |
| 10,894,710 | B1 * | 1/2021 | Johnson | B63B 17/0036 |
| 2004/0182136 | A1 | 9/2004 | Halla et al. | |
| 2004/0234338 | A1 * | 11/2004 | Monroe | B67D 7/3218 405/52 |
| 2012/0205004 | A1 * | 8/2012 | Webb | B60S 5/02 141/98 |

OTHER PUBLICATIONS

International Search Report and Written Opinion received for PCT Patent Application No. PCT/US2021/037089, mailed on Mar. 20, 2023, 16 pages.
Invitation to Pay Additional Fees received for PCT Patent Application No. PCT/EP2022/079417, mailed on Feb. 7, 2023, 11 pages.

* cited by examiner

MOBILE FUEL DISTRIBUTION STATION

CROSS-REFERENCE TO PRIOR APPLICATION

This application is a § 371 National Stage Application of PCT International Application No. PCT/EP2022/079417 filed Oct. 21, 2022, which claims the priority of European Application No. 21204067.9, filed Oct. 21, 2021, each of which are herein incorporated by reference in their entirety.

TECHNICAL FIELD

Embodiments herein relate in general to mobile fuel distribution stations with a plurality of fuel tanks, and especially to a mobile fuel distribution station comprising a central fuel refill arrangement and a fuel leakage prevention system arranged to prevent leakage from the central fuel refill arrangement, and from any of the plurality of fuel tanks. Other embodiments herein relate to a method and a system for predicting points of time for refilling fuel in one or more such mobile fuel distribution stations.

BACKGROUND

When it comes to fuel distribution stations a known problem is leakage of fuel and other aggressive fluids to the surrounding environment. Leakage into the surrounding environment results in environmental soil and/or water pollution. A common source of leakage from fuel stations is associated with fuel tanks. This is particularly true when it comes to metallic tanks, which may corrode or degrade over time, especially in environments with lot of moist. Pipe distribution systems connected to the tanks for refilling and fueling are other possible sources of leakage. Yet other sources may be related to humans, like dripping or overflow when a user is fueling a vessel from a pump, or dripping from pipes when the tanks are to be refilled from a petrol truck. Some modern types of fuel media may cause abnormal corrosion mechanisms in the material in tanks, piping and transfer units since the material is not adapted to such new fuel media. Thus, the risk of leakage is increased if some types of new fuel media is in use in older fuel stations. Break in and burglary is another risk that may cause damages resulting in leakage of fuel.

Yet another problem is related to unmanned stations where failure of lightning solution may cause zero visibility night-time on a marine fuel station increasing the risk of dripping. Still yet other problems related to fuel stations is the risk of explosions and fire. Fuels and thereto related media are very dangerous and for example an ignition spark or sparks due to static electricity may cause an explosion. Especially for unmanned fuel stations fire safety is crucial.

More and more transports in our world are ordered on demand from suppliers, clients and distributors. Optimal logistics and on-demand stock are important success factors within the industry. To meet such demands, more flexibility when it comes to transports is needed. One way of meeting such demands is to provide flexible and smart solutions for fuel stations, for example mobile fuel stations placed out after need. Mobile stations may be replaced and be set under service, which is an advantage. In view of the above-described drawbacks of known fueling stations, a mobile fuel station may be planned, constructed and placed into service in a much shorter amount of time and at a lower cost than known stations. In addition, the use of alternative energy sources is starting to become more prevalent in fuel markets. Indeed, the use and demand of alternative energy fuel for transportation is increasing at a rapid pace, and the types of fuels on demand and the consumption rates thereof can be expected to increase drastically from what has been seen to date. Fuel distribution stations that are able to distribute different types of fuels, such as gasoline, diesel, natural gas, hydrogen, methanol and electricity to quickly charge electric cars are needed. Accordingly, new generations of fuel distribution stations must be flexible in terms of size and the types of fuel that they may be able to store and dispense, as well as flexible in terms of changing their size and/or location in response to dynamically changing markets. With a mobile fuel station the demand for safe solutions from environmental and fire safety aspects are even higher since the environment in which they are placed may be sensitive and not adapted for a fuel station.

On a marine fuel station, some further problems and challenges are present. Dripping or overflow of fuel may occur during filling of the station, as well as when users are fueling their boats. In a marine environment, both the station and the vessel to be fueled may be in constant movement due to waves and wind thus increasing the risk. Further, the environment at sea exposes the fuel station for a lot of moisture and the presence of salt water may be troublesome when it comes to corrosion problems. Still further, if a marine fuel station is to be used all year round, ice forces acting on the station may cause breakage of critical structures resulting in the risk of leakage. In a marine environment, there is also a risk that a boat or a large, drifting object may collide with the station causing damages with leakage as a result. On the other side, the marine fuel station per se may drift away due to heavy winds, poor mooring chains or the like and collide. Yet another risk is if a marine fuel station is unmanned and available all times of day, dark combined with heavy wind or icing may cause a dangerous situation for the user increasing the risk of personal injuries.

An object of embodiments disclosed herein is to provide an improved mobile fuel station solving at least some of the problems raised above.

SUMMARY

In embodiments herein, a mobile fuel distribution station is provided. The mobile fuel distribution station comprises a plurality of fuel tanks, one or more fuel pumps arranged to distribute fuel from said fuel tanks to users, a central fuel refill arrangement for refilling of one or more of said plurality of fuel tanks, and a fuel leakage prevention system. The fuel leakage prevention system is arranged to prevent leakage from the central fuel refill arrangement, and from any of said plurality of fuel tanks.

In embodiments herein, the fuel leakage prevention system is arranged to alert an alarm if a fuel leak is identified.

In embodiments herein, the alarm is sent to a remote unit.

In embodiments herein, the fuel tanks are provided with double walls with a cavity with vacuum, or overpressure in between, and wherein one or more sensors for detecting a fuel leakage are arranged connected to said cavity.

In embodiments herein, the refill arrangement is provided with a drip and overfill protection arrangement.

In embodiments herein, the fuel distribution station may be further provided with one or more ballast tanks along at least a part of the outer periphery of the fuel distribution station.

In embodiments herein, the mobile fuel distribution station is arranged to be floating in water.

In embodiments herein, the mobile fuel distribution station may be further provided with a mooring system.

In embodiments herein, the mobile fuel distribution station may be further provided with an arrangement for towing the station.

In embodiments herein, the mobile fuel distribution station is provided with an adaptive stabilizing/gyro function whereby the station is kept substantially positioned horizontally irrespective of the respective load in the plurality of fuel tanks.

In embodiments herein, two or more of the plurality of fuel tanks are interconnected, whereby fuel may be pumped from one tank to another.

In embodiments herein, the ballast tanks provide for a balance/gyro function, whereby the station is kept substantially positioned horizontally irrespective of the respective load in the plurality of fuel tanks.

In embodiments herein, the fuel distribution station may be further provided with a roof.

In embodiments herein, the mobile fuel distribution station may be further provided with a plurality of centrally positioned tubes providing gas evaporation for each of the plurality of fuel tanks. The tubes may serve as dearration vent pipes.

In embodiments herein, the fuel tanks and/or other parts being in contact with the fuel at least partially is made of a composite material.

In embodiments herein, the mobile fuel distribution station may be further being provided with a plurality of inspection hatches, of a size allowing a human with protective gear to enter for inspection.

In embodiments herein, the mobile fuel distribution station may be further provided with an outer fender positioned along the periphery of the station and arranged to absorb shock forces. Further, an ecobark material enable to absorb fuels, oils and other similar fluids may be arranged along the periphery of the station.

In embodiments herein, the mobile fuel distribution station may be further being provided with means for identification of a user.

According to another aspect, a method for predicting points of time for refilling fuel in one or more mobile fuel distribution stations is provided. The method comprises collecting fuel distribution station data from each of the one or more mobile fuel distribution stations, and identifying a plurality of users of the one or more mobile fuel distributions stations, collecting user data from each of the identified users sending the collected fuel distribution station data and the user data to a processing arrangement, processing the collected data in the processing arrangement, calculating, based on the processed data, one or more predicted points of times for refill of fuel in the fuel distribution stations, sending instructions for refill from each of the one or more mobile fuel distribution stations based on the calculated one or more predicted points of time to a fuel provider.

In other embodiments, collecting user data further comprises comparing the one or more identified users with a client user list, and if a user is identified as a client user, collecting historical client user data from the one or more fuel distribution stations.

In other embodiments, collecting historical user data comprises at least one of identifying amount and type of fuel filled by the client user at the latest mobile fuel station refill session, or calculating an average value of amount of filled fuel based on a plurality of mobile fuel station refill sessions, or calculating a median value of amount of filled fuel based on a plurality of mobile fuel station refill sessions.

In other embodiments, the wherein identifying the plurality of users is performed by use of the AIS system.

In other embodiments, collecting fuel distribution station data further comprises collecting the position of each fuel distribution station, and wherein collecting user data further comprises, collecting user data for position, speed and heading, identifying, based on the collected user data for position, speed and heading, one or more mobile fuel refill stations suitable for a future user refill session, calculating, based on the collected user data for position, speed and heading, one or more predicted points of times for the future user refill session in the identified fuel distribution stations.

In other embodiments, collecting user data further comprises collecting historical user data for position, speed and heading and collecting historical client user data from the one or more fuel distribution stations. Further, the method comprise calculating, based on the historical collected user data for position, speed and heading, and the historical client user data a predicted amount of fuel in a future user refill session.

In other embodiments, collecting fuel distribution station data comprises collecting present fuel amount value for one or more present fuel types and comparing the collected fuel amount value with a predetermined threshold value. If the collected fuel amount value is less than the predetermined threshold value, the method further comprises sending instructions for refill to a fuel provider.

In another aspect a system for predicting points of time for refilling fuel in one or more mobile fuel distribution stations is provided. The system comprises means for collecting fuel distribution station data, means for collecting users status data from each of a plurality of users of the one or more mobile fuel distributions station, a processing arrangement arranged for processing the fuel distribution station data and the users status data, and for calculating, based on the processed data, one or more predicted points of times for refill of fuel, and arranged for sending instructions for refill from each of the one or more mobile fuel distribution stations based on the one or more predicted points of time to at least one fuel provider.

DETAILED DESCRIPTION

Figure 1:
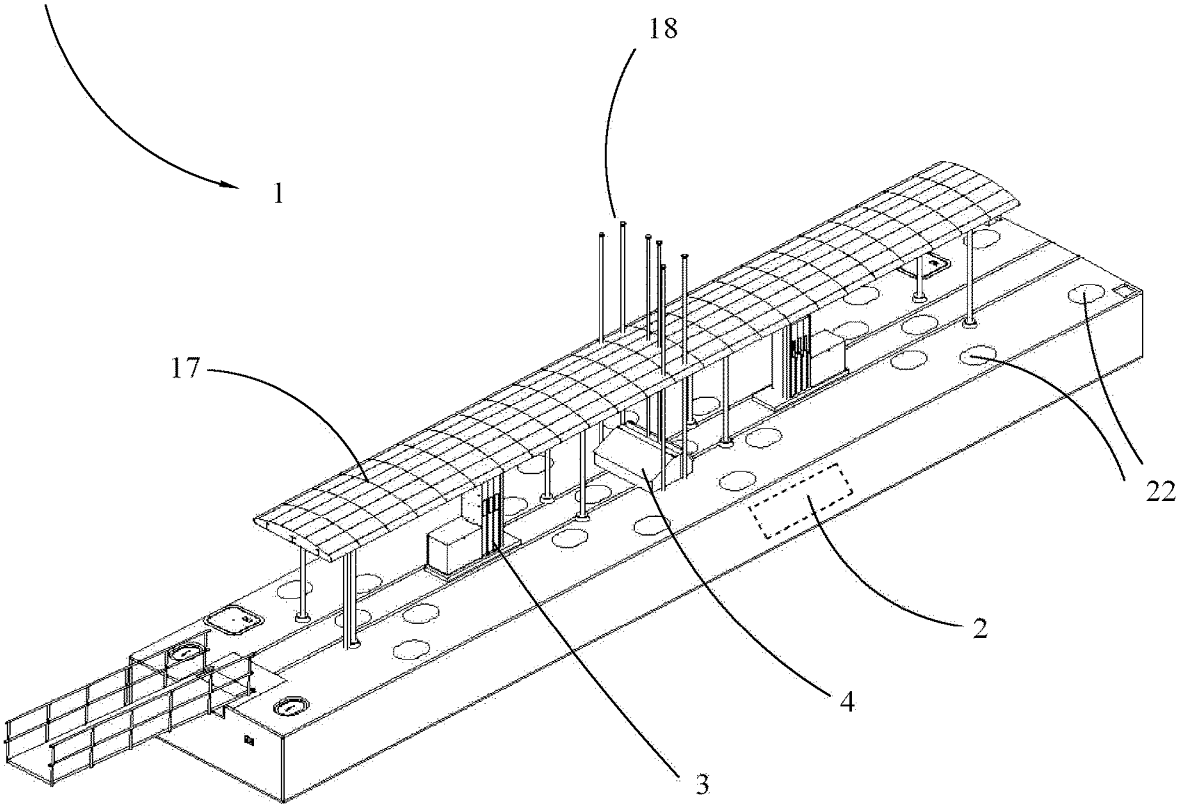
FIG. 1 shows a perspective view of an exemplified mobile fuel distribution station.
Figure 2:
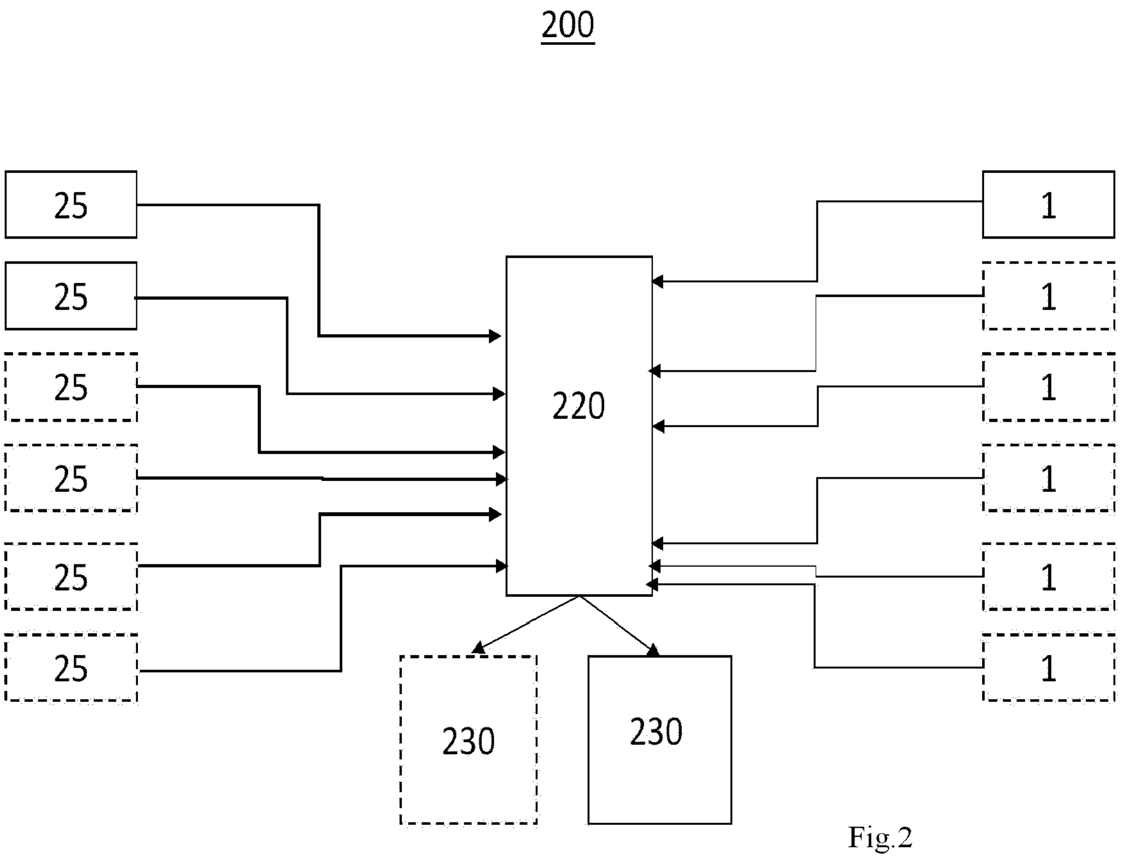
FIG. 2 is a block diagram for a system in accordance with embodiments herein.
Figure 3:
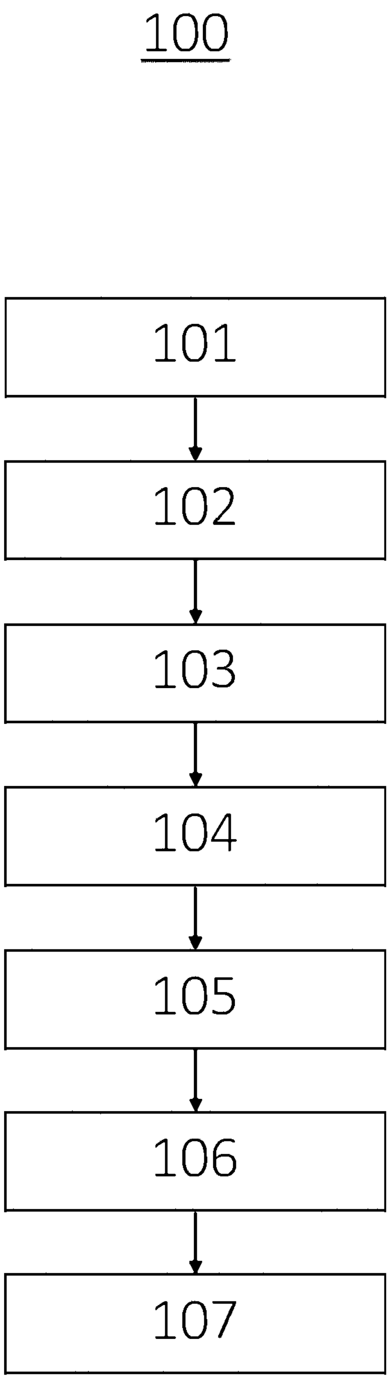
FIG. 3 is a flow chart for a method in accordance with embodiments herein.
Figure 4:
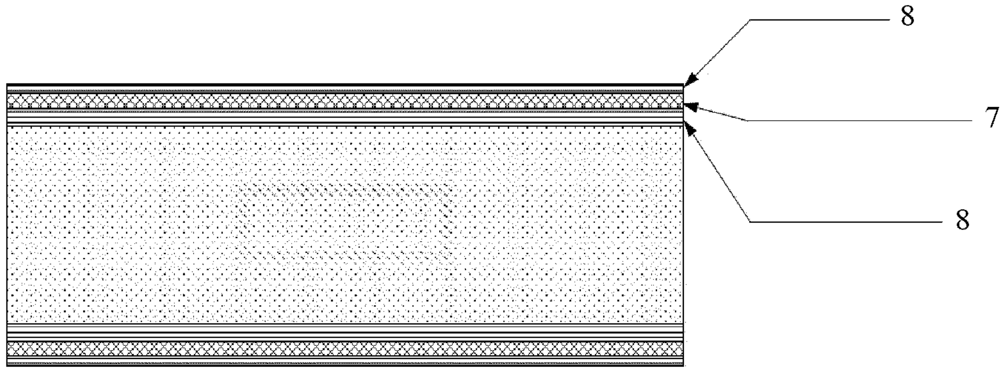
FIG. 4 shows details of a fuel tank wall in accordance with embodiments herein.
Figure 5:
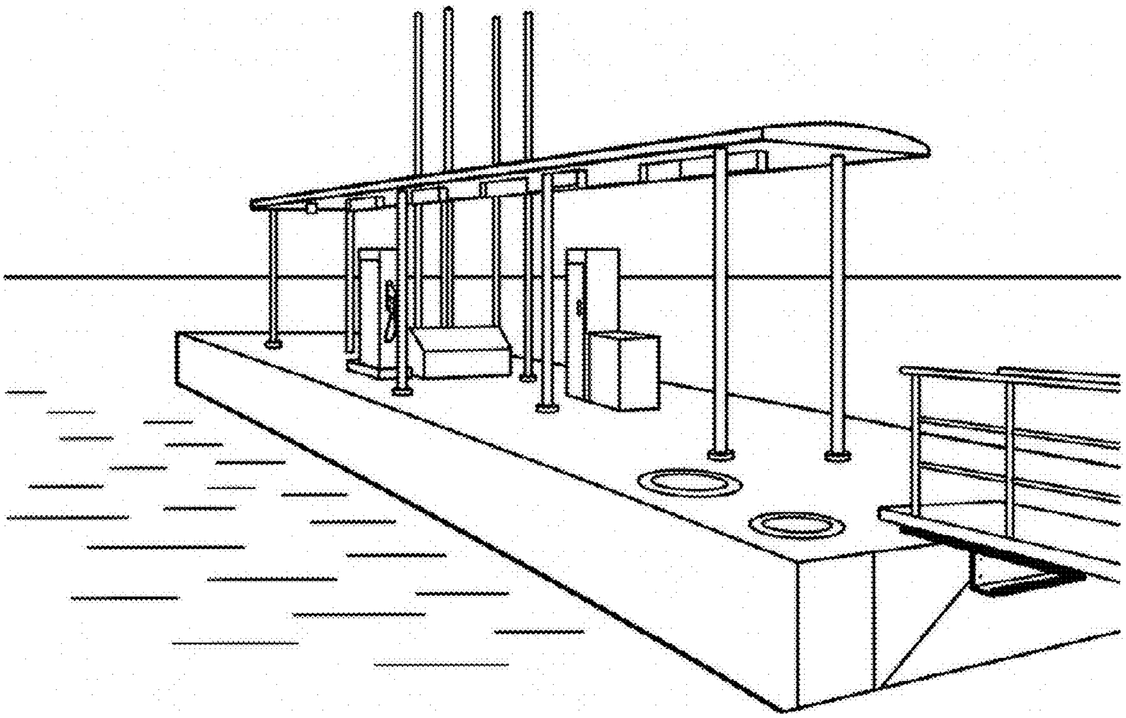
FIGS. 5-10 show different views of an exemplified mobile fuel station.
Figure 6:
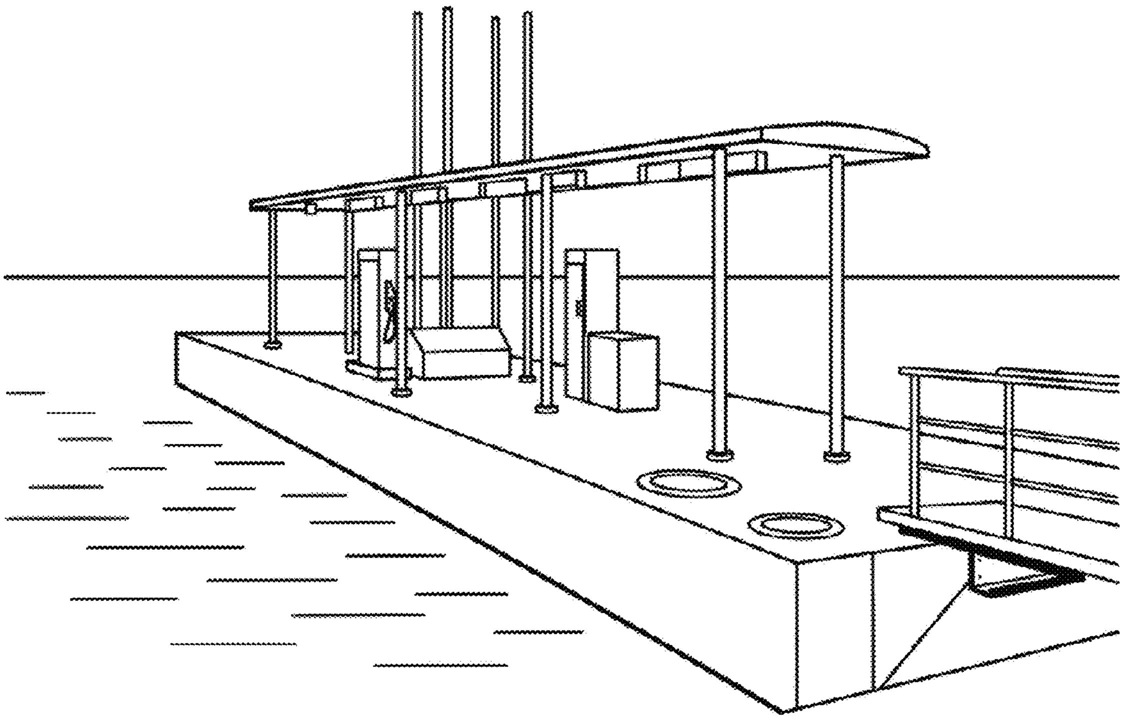
Figure 7:
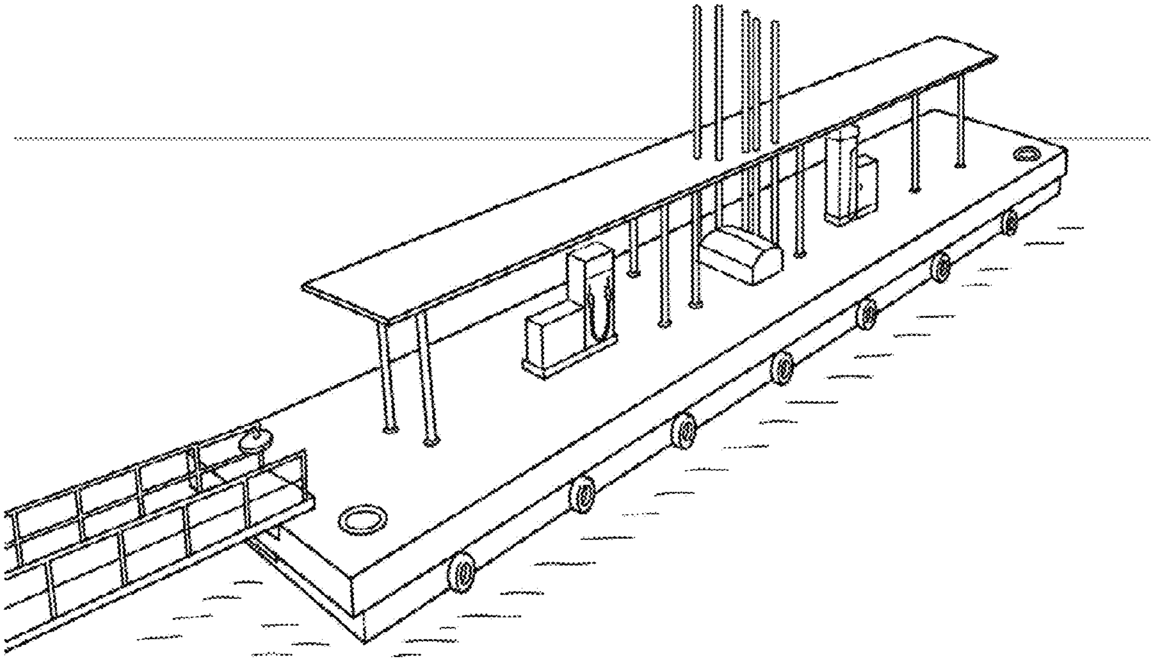
Figure 8:
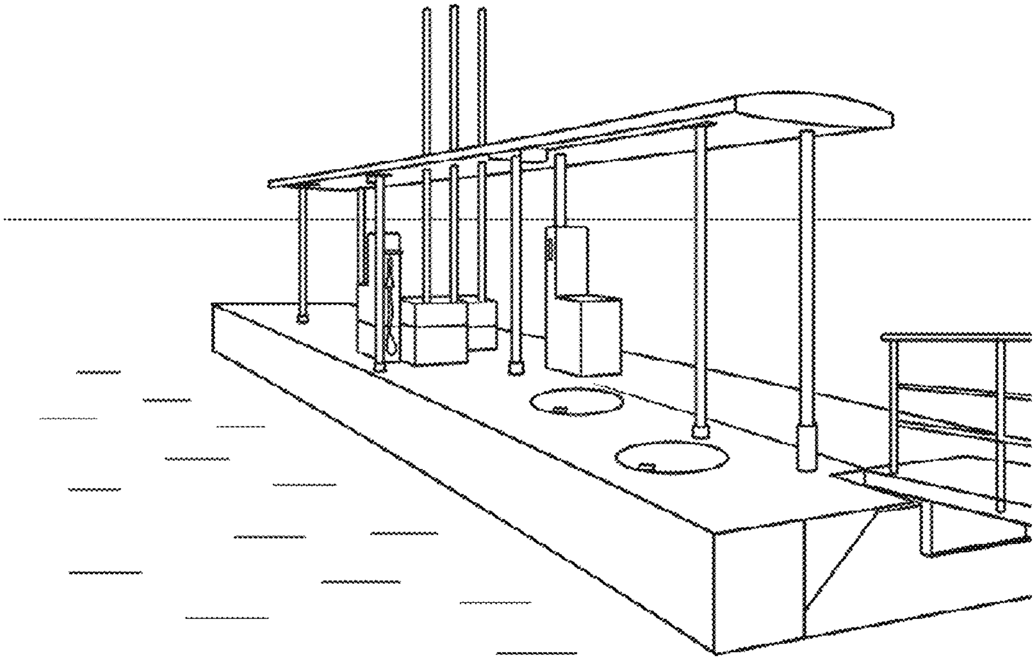
Figure 9:
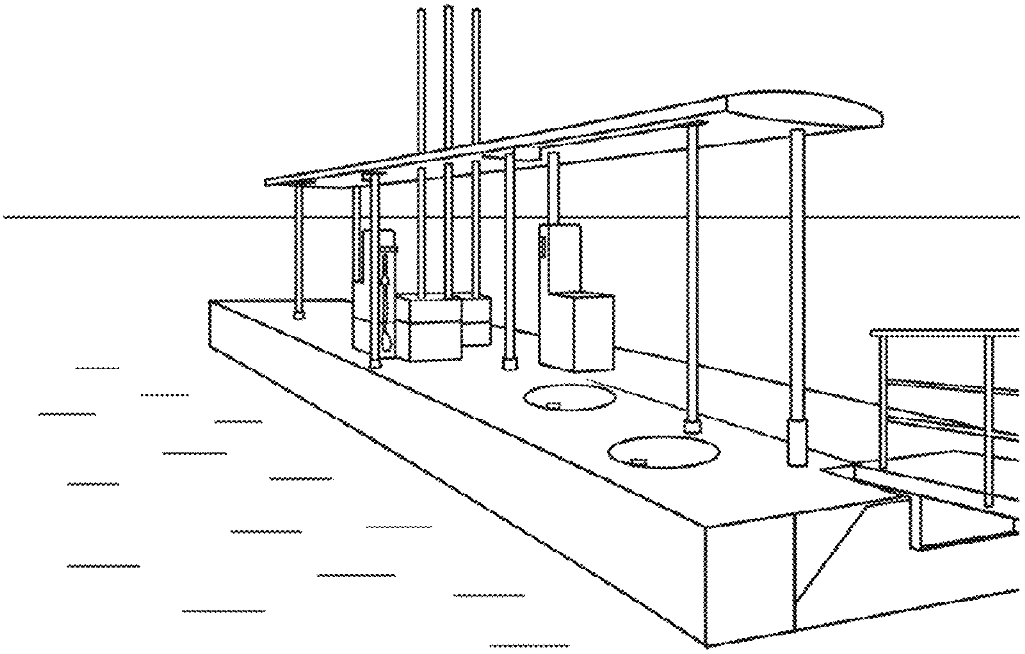
Figure 10:
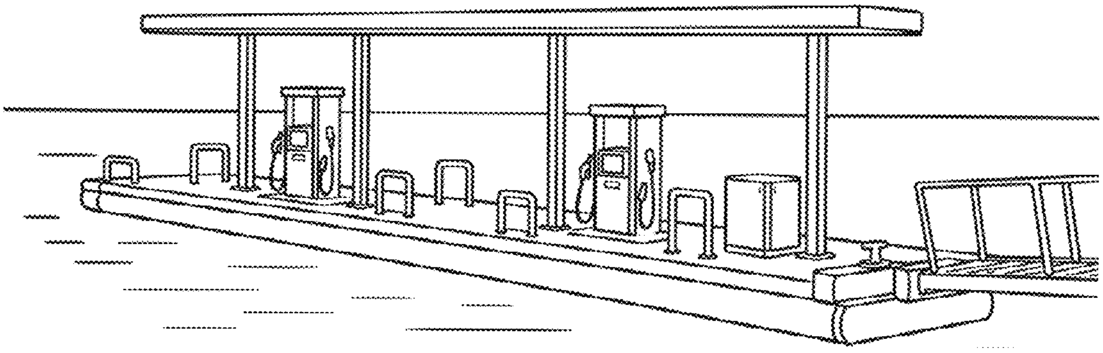

FIG. 1 shows a perspective view of a mobile fuel distribution station 1 according to embodiments herein. The mobile fuel distribution station 1 comprises a plurality of fuel tanks 2 and one or more fuel pumps 3 arranged to enable the users 25 to distribute fuel from the fuel tanks 2 to for example a vessel. The mobile fuel distribution station 1 further comprises a central fuel refill arrangement 4 for refilling of one or more of the plurality of fuel tanks 2, and a fuel leakage prevention system 5. The fuel leakage prevention system 5 is arranged to prevent leakage from the central fuel refill arrangement 4, and from any of the plurality of fuel tanks 2. The fuel leakage prevention system is arranged to alert an alarm if a fuel leak is identified. Such an alarm may for example be a local alarm of sound or lights, or an alarm may be sent to a remote unit, like an external device such as an operation central or the like. The external alarms may be sent by a wireless connection. The external alarm may be sent to a mobile application used by an operator.

The refill arrangement is provided with a drip and overfill protection arrangement. Around the refill pipes, a collection vessel (not shown) is provided. The arrangement provides for a tight seal against the environment, and may be provided with sensors indicating if fuel is present or not. An alarm may be provided, local or remote, if the presence of fuel is detected.

It is to be noted the mobile fuel distribution station 1 may be arranged to be floating in water, or to be place on a hard surface like on land. When in use at sea, the mobile fuel distribution station 1 may be further provided with a mooring system, and an arrangement for towing the station. Thereby, the mobile fuel distribution station 1 may easily be moved from one place to another by towing, and then being moored at a new position.

It is to be noted that the mobile fuel distribution station 1 according to some of the embodiments herein is a fully automatic liquid filling station for use as a marine station, that meets the requirements set by environmental legislation. The provided station handles both environmentally friendly and more traditional fuels for recreational, police, professional and rescue boats. The mobile fuel distribution station provides for a unique functional design and composite material, and is equipped with the latest technical systems for environmental safety, burglary protection, fire safety and seaworthiness. The structural design of the provided fuel distribution station is approved by Det Norske Veritas (DNV).

The fuel distribution station 1 may be further provided with a roof 17. The roof may serve for a plurality of purposes; to protect the more sensitive equipment on the upper part of the station with the fuel pumps 3, card readers and other electronics from rain and snow, as well as providing a rain shield to provide some comfort for the users 25 of the station. The roof may provide a plurality of technical functions despite pure protection, i.e a lightning arrangement, sensors for detecting increased temperature, presence of smoke or other gases, or detection of movements. The sensors may be connected to an operation system, indicating normal operation or, if any detected value increases a predetermined threshold value sending an alert to an external unity, or providing a local alarm, like a sound and/or voice alarm. The roof may also house a sprinkler system for automatic fire extinguishing, in the case of a fire being detected by said sensors.

By providing light during the dark period of the day, the safety of the station is increased, and the light further facilitates to detect the presence of anyone with doubtful purposes on or in the vicinity of the mobile fuel station. Cameras as well as motion detectors may be arranged on the inner side of the roof to ensure proper function of the station, and to provide increased safety for the users.

The plurality of fuel tanks may be arranged in parallel longitudinally extending along the marine fuel station 1. However, any other arrangement of the tanks may be used, like two tanks arranged side by side, or any other constellation.

The fuel leakage prevention system will now be described more in detail. The fuel leakage detection and prevention system comprises a plurality of interconnected features, overall contributing to provide a safe mobile fuel distribution station well adapted to be safely operated unmanned at sea.

The first part of the fuel leakage detection and prevention system relates to the central fuel refill arrangement. Refilling of a fuel station is always a risk and it is very important to as long as possible avoid leakage of fuel out into the environment. This is especially important when in use in sensitive environments, like on sea, in the archipelago or in fresh water lakes.

The second part of the fuel leakage detection and prevention system relates to the plurality of tanks and will now be described. The fuel tanks is provided with double walls with a cavity with vacuum or overpressure in between, and wherein one or more sensors for detecting a fuel leakage are arranged connected to the cavity. Each tank may thus be provided with two or more walls, and a double wall tank is shown in the figures. The double walls provide a cavity wherein there is vacuum or overpressure, depending on chosen configuration of leakage protection system. The advantage when compared to a conventional single wall is that it provides additional leakage protection, as well as enables sensors for detecting potential leakage of fuel to be installed adjacent to the cavity. Leakage may be indicated for example by providing sensors measuring pressure arranged in connection to the cavity.

Another advantage, when compared to using two separate tanks with a space in between, is that the internal volume is maximized. Thanks to the double walls, the volume for storing fuel can be optimized. The double wall construction is very strong and enables the unused space to be a minimum of the total volume space. The tanks are integrated in the overall design of the station and therefore no extra space need to be located separately to tanks or to stability and reinforcement parts respectively since all functions are integrated in a single concept. The larger capacity of the tanks also results in less need of refill of the station, like fewer tank truck deliveries.

Further, the fuel distribution station may be provided with one or more ballast tanks along at least a part of the outer periphery of the fuel distribution station. The ballast tanks are arranged substantially along the periphery of the fuel station and may serve for several purposes. If a collision occurs, the ballast tanks protects the fuel tanks and the tube connections related thereto by serving as a deformation zone absorbing shock forces. Thereby, damages with leakage as a consequence is prevented.

The mobile fuel distribution station may further be provided with an adaptive stabilizing/gyro function whereby the station is kept substantially positioned horizontally irrespective of the respective load in the plurality of fuel tanks, or wind or waves in the environment. The mobile fuel distribution station may be provided with an adaptive stabilizing/gyro function whereby the station is kept substantially positioned horizontally irrespective of the respective load in the plurality of fuel tanks. The ballast tanks may be used in conjunction with gyroscopic sensors and a pump system to ensure that the mobile fuel station is placed even substantially horizontally at all times. This is especially important when it comes to marine fuel stations since heavy wind or uneven load in the fuel tanks may cause the marine mobile stations to tilt or incline. If the station is not properly positioned, there is an increased risk. An unbalanced station may in a worst case scenario tilt over, or, even if only slightly inclined a user may slip or fumble while operating the unmanned station. This is especially true in marine environments, with rain or moisture on the deck, and even more so for an unmanned station. Yet another way to provide for stability of the stations is that two or more of the plurality of fuel tanks may be interconnected, whereby fuel may be pumped from one tank to another. Thereby, uneven load between the fuel tanks causing decreased stability of the station can be prevented.

In the embodiments shown in the figures, the mobile fuel distribution station is further provided with a plurality of centrally positioned tubes providing for gas evaporation for each of the plurality of fuel tanks. An advantage with this placement of such tubes is that it gives maximum room for exhaust gases to evaporate, without risk of the fuel filled gas clouds are able to reach any form of electrical equipment, before being safely dispersed into the surrounding air.

In embodiments herein, the fuel tanks and/or other parts being in contact with the fuel at least partially is made of a composite material. Composite is light and strong, and not exposed to problems with corrosion in heavy duty environments like on or near the sea.

The mobile fuel distribution station uses composite material providing customized functional design using material of military origin and the latest technology for spill protection, fire protection and surveillance. Composite material makes the provided station 70 percent lighter than a corresponding, traditional marine station, and it is more resistant to external and internal corrosion compared to steel and concrete. The internal tanks (cistern), piping and pumps can handle all types of fuel and a plurality of different ones simultaneously.

In embodiments herein, the mobile fuel distribution station may be further being provided with a plurality of inspection hatches. The placement and dimension of said inspection hatches allow for staff equipped with mandatory protective gear to enter inside the tanks and perform routine and scheduled inspection, as well as maintenance.

In embodiments herein, the mobile fuel distribution station may be further provided with an outer fender. The fender is arranged to provide for a collision protection if a ship or any other object hits or collide with the station. Further, an ecobark is provided. The ecobark is arranged very close to the waterline and is arranged to absorb liquids like fuel, oil and the like. Thereby, the sensitive marine environment at sea is protected from pollution. The fender and the ecobark may be positioned along the periphery of the station. The fender above the waterline near the rail of the station, and the ecobark more or less in the waterline of the mobile marine fuel station. Thereby, if fuel drippage into the sea occur when the users of the stations are fillings there vessels such fuel drippage can be absorbed.

The stations are thus equipped with effective spill protection and may sanitize any spills automatically, without affecting the ecosystem around the station. Further, a burglary protection may be present. The theft protection reduces the risk of disruption and financial losses, as well as spills of hazardous waste. The station may use low-energy LED lighting and a fully automatic fire protection system with sprinklers, camera surveillance and alarms. More secure handling of fuel in several aspects may result in lower insurance costs. There is an option to run such stations unmanned, around the clock, with card machines. GPS positioning facilitates navigation to the station.

A method and a system for predicting points of time for refilling fuel in one or more mobile fuel distribution stations 1 will now be described more in detail. The method may be performed for a single mobile fuel distribution station as well as for a fleet comprising a large number of stations. The method comprises collecting fuel distribution station data from each of the one or more mobile fuel distribution stations 1. For example, each of the stations can be connected to a central control unit provided with a processing arrangement., and located anywhere. The connection may be a wireless connection, or any other suitable means for connection. The method comprises identifying a plurality of users 25 of the one or more mobile fuel distributions stations 1. Identification may be performed for example by a chip located on a user vessel and an RFID reader located at a mobile fuel station 1. Alternatively, a user 25 may be identified by the AIS system. The automatic identification system, AIS, is an automatic tracking system that uses transceivers on ships. Information provided by AIS equipment, such as unique identification, position, course, and speed, can be displayed on a screen or an electronic chart display and information system. Thus, methods herein may comprise identifying a plurality of users 25 by use of the AIS system. A user 25 may thus be identified by use of the AIS system, or any other suitable method for identification. Still further, official records from the AIS system, or the like, may be used to calculate and predict upcoming needs for the user. A special offer may be sent to a user based on such calculations.

The method further comprises collecting user 25 data from each of the identified users 25. Collecting user 25 data may further comprise comparing the one or more identified users 25 with a client user 25 list. After identification of the identity of a user 25, the identity may thus be compared to a client user 25 list in order to check if the user 25 is a present client or not. Such a client list may for example be any list of users of a single mobile marine fuel station, or of a fleet with a large number of mobile fuel stations. Depending of the outcome of such comparation, any of the following actions may be taken. An identified client user may for example be billed automatically after a refill session, or may receive messages regarding offers suitable for the clients historical consumption pattern. Historical data for a client user and records from systems like the AIS system or the like may be used to calculate an estimated consumption of fuel during a defined time period, for example since the last refill session at a specific station. Based on such calculations, a comparation with historical data at the station, or stations, may be used to estimate how large part of the total fuel consumption of the client user that is provided by the mobile fuel distribution station, or stations. Thereby, the most important client users may be identified. Such calculations predicting consumption of the client user may as well serve to predict if relevant fuel amount is present at a mobile fuel distribution station suitable for a refill session for the client user.

If a user 25 is identified as a client user 25, the method may comprise collecting historical client user 25 data from the one or more fuel distribution stations 1. Such historical client user data may for example be which mobile fuel distribution station 1 that the user visited last, the type of fuel usually filled and the amount of fuel last filled. Other historical data of interest may be time intervals of fuel filling. Thus, collecting historical user 25 data may for example comprise at least one of identifying amount and type of fuel filled by the client user 25 at the latest mobile fuel station refill session, or calculating an average value of amount of filled fuel based on a plurality of mobile fuel station refill sessions, or calculating a median value of amount of filled fuel based on a plurality of mobile fuel station refill sessions.

Still further, the method may comprise sending the collected fuel distribution station data and the user 25 data to a processing arrangement, processing the collected data in the processing arrangement (220), calculating, based on the processed data, one or more predicted points of times for refill of fuel in the fuel distribution stations 1, and sending instructions for refill from each of the one or more mobile fuel distribution stations 1 based on the calculated one or more predicted points of time to a fuel provider 24.

It may be noted that a number of different parameters may be used for triggering an instruction for refill. For example, if a specific type of fuel tends to run empty, a specific instruction may be sent immediately for that specific fuel. Fuel filling instructions may be adjusted depending on present season, or trends regarding consumption of specific fuel types during the last three months, or any other time periods. Still further, fluctuations of purchase prices, or accessibility on the market for specific fuel types may be used to trigger a refill instruction, or a notification to the system.

According to methods herein, collecting fuel distribution station data may further comprise collecting the position of each fuel distribution station 1, and collecting user 25 data for position, speed and heading. Thereby, it may be determined which mobile fuel station 1 that is closest to the user. The method may comprise, identifying, based on the collected user 25 data for position, speed and heading, one or more mobile fuel refill stations 1 suitable for a future user 25 refill session. Still further, methods herein may comprise, calculating, based on the collected user 25 data for position, speed and heading, one or more predicted points of times for the future user 25 refill session in the identified fuel distribution stations 1.

In methods herein, collecting user 25 data may further comprise, collecting historical user 25 data for position, speed and heading, and collecting historical client user 25 data from the one or more fuel distribution stations 1. Methods herein may further comprise, calculating, based on the historical collected user 25 data for position, speed and heading, and the historical client user 25 data a predicted amount of fuel in a future user 25 refill session.

The outcome of the steps above can be used to check if a mobile fuel refill station 1 located near a user actually is able to provide a user 25 with presumed whished amount and type of fuel in a possible future refill session. Thereby, the method may provide for optimizing the performance of running a mobile fuel distribution station when it comes to provide users with desired products and services.

In still other methods herein, collecting fuel distribution station data may comprise collecting present fuel amount value for one or more present fuel types, comparing the collected fuel amount value with a predetermined threshold value, and if the collected fuel amount value is less than the predetermined threshold value, sending instructions for refill to a fuel provider 24. For example, if a specific type of fuel tends to run out, an immediate filling instruction may be sent, or an alarm message may be provided.

A system 2 for predicting points of time for refilling fuel in one or more mobile fuel distribution stations 1 will now be described. The system 2 comprising means for collecting fuel distribution station data. For example, consumption in different time periods for different types of fuels, trends for short or long time periods, purchase prices may be collected, as well as data regarding consumptions and purchases performed by present client users.

Further, the system comprises means for collecting users 25 data from each of a plurality of users 25 of the one or more mobile fuel distributions station 1. User data may be any type of data connected to the user, both official records like track records from the AIS system or the like, or client user specific data like historical purchases performed by the client. The system further comprises a processing arrangement 220 arranged for processing the fuel distribution station data and the users 25 status data. The processing arrangement may be any arrangement comprising at least one processing devices able to collect and process data. Such an arrangement may comprise local devices, or remote devices, or both. The at least one processing device may be one processing device, or a number of processing devices between which signals are transmitted. Some processing may e.g. take place in one processing device, and signals may then be transmitted to one or more other processing devices for further processing. The processing arrangement is further arranged for calculating, based on the processed data, one or more predicted points of times for refill of fuel, and arranged for sending instructions for refill from each of the one or more mobile fuel distribution stations 1 based on the one or more predicted points of time to at least one fuel provider 24.

The invention claimed is:

1. A method for predicting points of time for refilling fuel in one or more mobile fuel distribution stations, wherein at least one of the mobile fuel distribution stations comprises: a plurality of fuel tanks, one or more fuel pumps arranged to distribute fuel from said fuel tanks to users, a central fuel refill arrangement for refilling of one or more of said plurality of fuel tanks, and a fuel leakage prevention system, wherein said fuel leakage prevention system is arranged to prevent leakage from the central refill arrangement, and from any of said plurality of fuel tanks, the method comprising:

- collecting fuel distribution station data from each of said one or more mobile fuel distribution stations, and
- identifying a plurality of users of the one or more mobile fuel distributions stations,
- collecting user data from each of said identified users,
- sending said collected fuel distribution station data and said user data to a processing arrangement,
- processing said collected data in said processing arrangement,
- calculating, based on said processed data, one or more predicted points of times for refill of fuel in said fuel distribution stations, and
- sending instructions for refill from each of said one or more mobile fuel distribution stations based on the calculated one or more predicted points of time to a fuel provider.

2. The method according to claim 1, wherein said collecting user data further comprises:

- comparing the one or more identified users with a client user list, and
- if a user is identified as a client user, collecting historical client user data from said one or more fuel distribution stations.

3. The method according to claim 2, wherein said collecting historical user data comprises at least one of

- identifying amount and type of fuel filled by the client user at the latest mobile fuel station refill session,
- calculating an average value of amount of filled fuel based on a plurality of mobile fuel station refill sessions, and
- calculating a median value of amount of filled fuel based on a plurality of mobile fuel station refill sessions.

4. The method according to claim 1, wherein said identifying a plurality of users is performed by use of the AIS system.

5. The method according to claim 4, wherein said collecting fuel distribution station data further comprises collecting the position of each fuel distribution station, and wherein said collecting user data further comprises, collecting user data for position, speed and heading, identifying, based on the collected user data for position, speed and heading, one or more mobile fuel refill stations suitable for a future user refill session, and calculating, based on the collected user data for position, speed and heading, one or more predicted points of times for said future user refill session in said identified fuel distribution stations.

6. The method according to claim 1, wherein said collecting user data further comprises:

collecting historical client user data from said one or more fuel distribution stations, and calculating, based on the historical collected user data for position, speed and heading, and the historical client user data a predicted amount of fuel in a future user refill session.

7. The method according to claim 1, wherein said collecting fuel distribution station data comprises:

collecting present fuel amount value for one or more present fuel types, comparing said collected fuel amount value with a predetermined threshold value, and if said collected fuel amount value is less than said predetermined threshold value, sending instructions for refill to a fuel provider.

* * * * *